US008352697B2

(12) United States Patent
Lasser (10) Patent No.: US 8,352,697 B2
(45) Date of Patent: Jan. 8, 2013

(54) METHOD OF MANAGING FILES FOR OPTIMAL PERFORMANCE

(75) Inventor: Menahem Lasser, Kohav Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 575 days.

(21) Appl. No.: 10/952,837

(22) Filed: Sep. 30, 2004

(65) Prior Publication Data
US 2005/0256838 A1 Nov. 17, 2005

Related U.S. Application Data

(60) Provisional application No. 60/571,850, filed on May 17, 2004.

(51) Int. Cl.
*G06F 12/00* (2006.01)
(52) U.S. Cl. ............... 711/170; 707/1; 707/999.001; 707/E17.01
(58) Field of Classification Search .......... 711/170; 707/1, 999.001, E17.01
See application file for complete search history.

(56) References Cited

U.S. PATENT DOCUMENTS

| | | | |
|---|---|---|---|
| 5,283,730 A * | 2/1994 | Ito .......................... | 700/90 |
| 5,404,485 A | 4/1995 | Ban | |
| 5,701,516 A * | 12/1997 | Cheng et al. .............. | 710/22 |
| 6,070,172 A * | 5/2000 | Lowe ....................... | 707/205 |
| 6,081,508 A * | 6/2000 | West et al. ................ | 370/238 |
| 6,272,571 B1 * | 8/2001 | Bachmat .................... | 710/74 |
| 6,282,605 B1 * | 8/2001 | Moore ...................... | 711/103 |
| 6,862,563 B1 * | 3/2005 | Hakewill et al. .......... | 703/14 |
| 2003/0200002 A1 * | 10/2003 | Kwon ........................ | 700/94 |
| 2004/0193564 A1 | 9/2004 | Ban et al. | |

FOREIGN PATENT DOCUMENTS

| | | | |
|---|---|---|---|
| GB | 2336009 A | * | 10/1999 |
| GB | 2411746 A | | 7/2005 |
| WO | 0049537 A2 | | 8/2000 |

OTHER PUBLICATIONS

U.S. Appl. No. 10/849,234, filed May 2004.
U.S. Appl. No. 60/549,891, filed Mar. 2003.
International Search Report and Written Opinion received in corresponding PCT Application No. PCT/IL2005/000511 from the International Searching Authority (US) dated Jun. 10, 2008, 7 pages.
Examination Report received in corresponding UK Application No. GB0625218.3 dated May 18, 2007, 5 pages.
Notice of Grounds for Refusal and translation dated Jul. 31, 2009 issued in Korean Patent Application No. 10-2006-7025847, 8 pages.

* cited by examiner

*Primary Examiner* — Mardochee Chery
(74) *Attorney, Agent, or Firm* — Toler Law Group, PC (57) ABSTRACT

A method of storing a file in a memory. An explicit command is issued to a file system to store the file in accordance with a desired performance characteristic of the file such as enhanced write performance, enhanced read performance or enhanced latency performance. The file system stores the file in the memory in accordance with the desired performance characteristic. Preferably the desired performance characteristic is achieved by storing the file in a physically contiguous portion of the memory or in a logically contiguous portion of the memory. After the explicit command has been issued for each of a plurality of files, the files may be stored concurrently.

25 Claims, 3 Drawing Sheets

METHOD OF MANAGING FILES FOR OPTIMAL PERFORMANCE

This is a continuation-in-part of U.S. Provisional Patent Application No. 60/571,850, filed May 17, 2004

FIELD AND BACKGROUND OF THE INVENTION

The present invention relates to file systems and, more particularly, to a file system that supports an explicit command to store files in accordance with desired performance characteristics of the files.

Almost all computer systems, whether large mainframes or tiny embedded micro controllers, need to store data such that the data shall not be lost when the system is powered down. Therefore those computers usually include some kind of Non Volatile Memory (NVM), in addition to any volatile memory they may use for running their programs. The NVM may be a magnetic disk, a flash memory chip, or any other non-volatile storage element.

Figure 1:
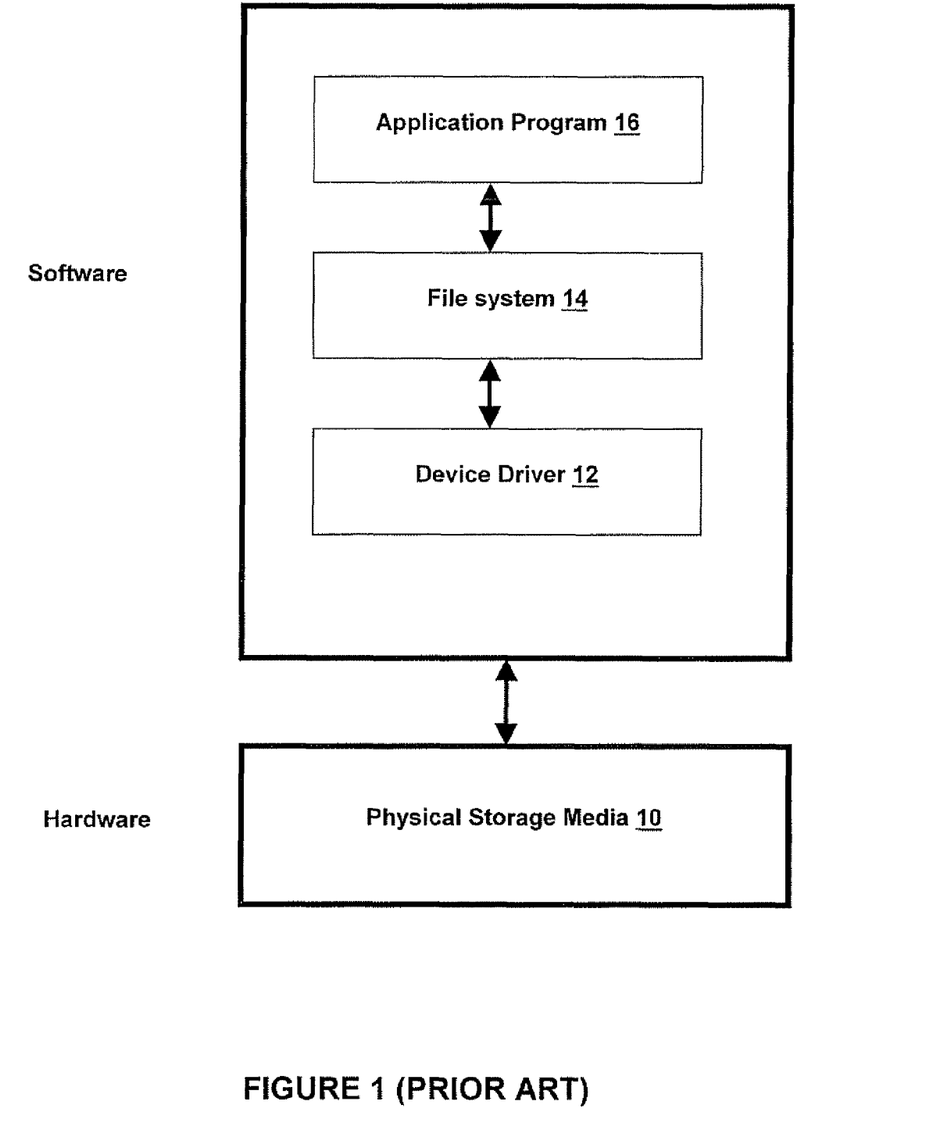
FIG. 1 illustrates how a data storage medium is accessed by software, both according to the prior art and according to the present invention.

FIG. 1 shows the general structure of how such a storage device is accessed. At the bottom of the Figure is a physical storage medium 10, which is the hardware layer implementing the physical storage. As each storage device may have its own unique interface and peculiarities which make it very inconvenient to work with, it is the common practice to have a software device driver 12 included in the operating system running on the computer (or running on the bare hardware, if no operating system is used), with this device driver 12 providing a simplified and standardized interface for other software components wishing to access the device. For storage devices 10 used for storing files (i.e. disks, diskettes, etc.), but not only for them, the interface provided by their device drivers 12 is usually of the type known as a "block device driver". Such device drivers 12 interact with their clients using blocks of data rather than single bytes. This applies to both input and output operations, that is, to both reading and writing. The most common example of a block device 10 is the magnetic disk, whose hardware interface is commonly configured for transferring only complete blocks (usually called "sectors" in this context), such as 512 bytes or more. It should be emphasized that it is not necessary for physical storage device 10 to be physically limited to block operations in order to have a device driver 12 presenting a block device interface. For example, a battery-backed RAM disk is not physically limited to blocks and may physically read and write each of its memory bytes. Still, typically its device driver 12 presents a block device interface to the rest of the system, so as to be compatible and interchangeable with magnetic disks. Therefore, for the purpose of the present invention, a block device is any device whose driver 12 presents a block device interface, regardless of its actual physical structure.

Figure 2:
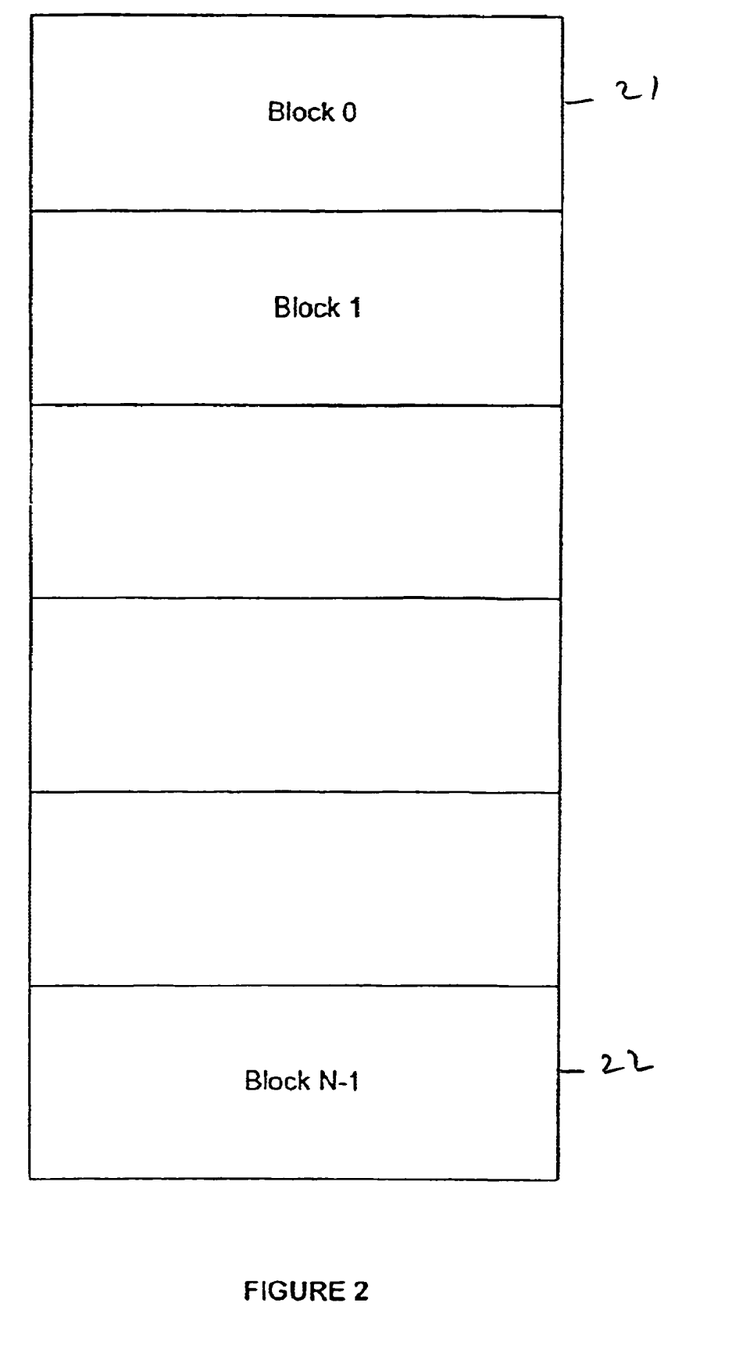
FIG. 2 shows the structure of a block device.

A block device seems to its users as a linear array of blocks of a certain fixed size. Each one of these blocks can be read or written independently of the other blocks using its index in the array, as shown in FIG. 2. The common practice (which is also used here) is to number the blocks starting from block number 0 (21), and ending in block number (N−1) 22, where N is the number of blocks exported by the device driver. Again it should be emphasized that this linear array structure does not necessarily exist at the physical device level. For example, a flash disk block device driver 12 also presents this linear array image, but internally the physical blocks on flash medium 10 are usually scattered in a random order (such that block number 0 may physically be located in the middle or the end of flash medium 10) due to the writing limitations in flash memory and the possible existence of bad blocks. It should also be understood that block device driver 12 has no knowledge of the contents put into its blocks by the upper software layers 14 and 16.

Referring again to FIG. 1, it is seen that there is usually a File System (FS) software layer 14 on top of device driver 12. A FS 14 is a software component which provides further insulation from physical device 10, by enabling the application programs 16 to interact with storage device 10 using only the concept of files, a concept which is much more natural and convenient to the typical programmer or user. FS 14 achieves this abstraction by organizing the user data on block device 10 into some logical structure, and associating the blocks containing a file's data with the file's attributes (i.e. file name, creation time, access permissions, etc.). For that purpose FS 14 stores into device 10 meta-data, which are not directly visible to the user, and which include the FS 14 internal book-keeping information with which FS 14 is able to trace and access the user files. For example, the Microsoft DOS FAT12 file system, which is one of the simplest FS commercially available, stores on storage device 10 a boot sector containing some basic parameters, allowing the location of the other meta-data structures (which must be in the first block of device 10), one or more copies of the File Allocation Table (FAT), which is the allocation map of device 10, and a root directory structure for locating files by name. Application programs 16 interact with FS 14 on the file-level, by issuing commands such as "open file", "delete file", "write file", etc. Application programs 16 thus are completely ignorant of the underlying block structure. There are many file systems 14 in use today, greatly differing in their internal structures and characteristics. In many cases (such as with the Linux operating system) an operating system even provides several file systems 14 to its users and they may choose the one most suitable for their needs.

While most prior art storage systems follow the layered modular separation between device driver 12 and file system 14 that is illustrated in FIG. 1, there are storage systems in which such clear separation does not exist and in which both device driver and file system functionalities are combined into one software module. Such systems are typically referred to as "monolithic" storage systems. It should be understood that while all explanations are given here using the layered model, the present invention is equally applicable to the monolithic model, where any reference to a "file system" should be interpreted as referring to the file-handling portion of the monolithic software, and any reference to a "device driver" should be interpreted as referring to the device-handling portion of the monolithic software.

More details of the considerations related to the handling of files by a file system are found in Mosek, US Patent Application Publication No. 2005/0193025, filed on May 20, 2004 and entitled "A File System that Manages Files According to Content". This patent application is incorporated by reference for all purposes as if fully set forth herein.

Prior art file systems 14 and storage device drivers 12 handle storage space allocation the same for all files. One must understand, though, that the way a file is allocated physical space may affect the performance the user will see when accessing the file.

As an example consider the case of reading a file that spans many sectors (a sector is the minimal chunk of data read or written to/from medium 10. A sector is typically 512 bytes long). Let us assume that storage medium 10 which is used by file system 14 is a solid-state flash disk. Assume that file system 14 is called upon to read the first 16 KB of the file. This translates to reading the first 32 data sectors. Even though the user logically views those 16 KB as if they are residing on medium 10 as a continuous stream of data, this is not necessarily the way the data are physically stored on medium 10. File systems 14 typically allocate medium space when there is a need for writing new data, and their allocation policy can be non-sequential. A simple example for this is the very widely used Microsoft FAT file system, the one used in DOS and many Windows operating systems. FAT allocates space in "clusters", with each cluster containing a few sectors (a typical case is 4 sectors per cluster). Even though the sectors within the same cluster will be allocated physically sequential locations on medium 10, there is no necessity that logically adjacent clusters (that is—clusters having adjacent logical addresses) will be physically close to each other on medium 10. File system 14 may decide to allocate clusters that were left free in the middle of the space used by another file, thus mapping a continuous range of logically sequential data into a few physically non-sequential chunks of medium 10. (Microsoft does provide a utility for "defragmenting" a disk drive. Such a utility re-arranges the files on the medium so that the files are "continuous". However, the defragmenting utility is very time-consuming and is typically run by the system's user only once in a few weeks, while in the in-between period the disk gradually returns to its "non-continuous" state. Additionally, one should distinguish between logically continuous storage and physically continuous or contiguous storage. For flash disks these are not the same. Due to flash limitations of bad blocks and the inability to rewrite without erasing big chunks of space, flash memory management systems employ mapping of logical addresses to physical addresses, so that even though the device driver reports continuous allocation, physically it is not so). More details of the way FAT-like file systems handle storage allocation are found in Ban et al., US Patent Application Publication No. 2004/0193564, filed on Mar. 27, 2003 and entitled "Robust Self-Maintaining File System". This patent application is incorporated by reference for all purposes as if fully set forth herein.

Many NAND-type flash memory devices (typically used for implementing solid-state disks or memory cards) have a feature of "continuous reading". This means that when the last byte of a flash page (the equivalent of a data sector on the device hardware level) is read out of the device, the device automatically starts loading its internal data buffer from the memory cells of the physically next page. In NAND flash, the time required for loading the data buffer with the stored data is relatively long and has a major effect on the reading performance of the memory system. A typical value for the time it takes to load the buffer is 15 microseconds. For a 16-bit wide device using 100 nanosecond bus cycles, the time required for transferring a 512-byte page over the bus is 256×0.1=25.6 microseconds, which is of the same order of magnitude as the buffer loading time. Therefore doing buffer loading in advance can significantly speed-up the reading of a sector, and consequently the reading of the file. However, such saving of time using the "continuous reading" feature is only possible when the next page to be read is physically sequential to the previously read page. It follows that reading performance is affected by the storage allocation policy and can benefit from "clever" allocation decisions.

Based on the above, it can be seen that it is advantageous to have files physically continuous on medium 10, so why not allocate all files like that? The reason is that even in a moderately-complex system file system 14 has to support hundreds of files residing in parallel within medium 10. Those files are created, written to, appended to, deleted, or otherwise changed in many complex and unpredictable sequences of events. Keeping all files physically sequential is simply impossible except in the most simple systems. For example, a user adding a few lines to an existing text file forces file system 14 to extend the file length. But if the space immediately following the file is currently used by another file, the only options available are to break the updated file to non-sequential parts, to move the entire other file to another location and use its old space for the updated file, or to move the entire updated file to another location where there is enough room. In almost all cases the preferred decision is to break continuity, as the other options are much more costly in time.

As another example, consider the case of writing a file into a flash disk. Flash memory devices have the characteristic that a page cannot be written into unless the block targeted for the write was previously erased. This implies that while the disk is being continuously used it is necessary to recycle (erase) blocks of the disk so as to make room for new data. Such recycling may be done only when there is an immediate need for free space, or it also may be done periodically or when the system has idle time. For better understanding the issues of flash memory allocation and recycling see Ban, U.S. Pat. No. 5,404,485, entitled "Flash File System", that issued on Apr. 4, 1995. This patent is incorporated by reference for all purposes as if fully set forth herein.

The time it takes a storage system to write a file depends on whether there is free space immediately available for allocation or whether some space first should be recycled in order to generate usable space. Erasing flash blocks is a rather slow operation (a few milliseconds in NAND flash and a few hundred milliseconds in NOR flash), so this might have a major impact on a file's write performance. If it could be guaranteed that the storage required for writing a file is somehow reserved for it in advance so that no recycling will be required, its write performance will be guaranteed to be higher.

Indeed, the idea of reserving flash space in advance of writing is not new—Intel Corporation provides a flash management software package called Flash Data Integrator (or "FDI" for short) that allows its user to "initialize" a "packet" of storage and then fill up the packet with data. The initialization includes the pre-allocation of free space, causing recycling if necessary. However, the FDI use of this idea is rather primitive and limited—it does not apply at all to files but to some type of objects which are primitive structures identified by a numeric identifier. Also, only one packet stream can be open for input at a time.

So prior art storage systems that treat all files the same in terms of space allocation, do not allow a user to obtain optimal performance for a specific file.

There is thus a widely recognized need for, and it would be highly advantageous to have, a file system 14 that allows an application program 16 to request special ad hoc storage of a file on a medium 10, for optimal performance It should be clarified here that the term "performance" as employed herein, refers not only to write performance or read performance, as might be suggested by the examples listed above. Performance should also be interpreted to include any other characteristics associated with the execution of storage system operations related to time. For example, the latency of a storage system is also a performance characteristic. By latency is meant the amount of time it takes the storage system to complete a single call. In some so-called "hard" real-time systems, it is a mandatory requirement that no single call should exceed a given duration, so that no delay will be incurred in performing some time-critical operation. So in such systems low latency is a required performance characteristic.

Also, it should be clarified that even though in all the examples presented herein media 10 are solid-state flash disks, the present invention is equally applicable to other types of storage media, including magnetic disks. Even though the considerations for what constitutes optimal allocation for a file generally are different for different media types, the same ideas still apply. For example, in magnetic disks there is the issue of optimizing the mechanical movements of the read/write heads used for accessing the storage area, with different considerations applying to reading and writing. Therefore the present invention as described and claimed below is also applicable to this case too.

SUMMARY OF THE INVENTION

According to the present invention there is provided a method of storing a file in a memory, including the steps of: (a) issuing an explicit command to a file system to store the file in the memory in accordance with a desired performance characteristic of the file; and (b) storing the file in the memory in accordance with the desired performance characteristic, by the file system.

According to the present invention there is provided a data processing device including: (a) a memory; and (b) a file system for storing a file in the memory, the file system supporting an explicit command to store the file in the memory in accordance with a desired performance characteristic of the file.

According to the present invention there is provided a computer readable storage medium having embodied thereon computer readable code for a file system, the computer readable code including program code that supports an explicit command to store a file in a memory in accordance with a desired performance characteristic of the file.

According to the present invention there is provided a method of storing a plurality of files in a memory, including the steps of: (a) for each file, issuing an explicit command to a file system to store the each file in the memory in accordance with a respective desired performance characteristic; and (b) storing the files in the memory in accordance with the desired performance characteristics, substantially concurrently, by the file system.

According to the present invention there is provided a data processing device including: (a) a memory; and (b) a file system for storing a plurality of files in the file system substantially concurrently, the file system supporting an explicit command to store each of the files in the memory in accordance with respective desired performance characteristics of each file.

According to the present invention there is provided a computer readable storage medium having embodied thereon computer readable code for a file system, the computer readable code including program code that supports an explicit command to store a plurality of files in a memory, substantially concurrently, in accordance with respective desired performance characteristics, the explicit command being issued separately for each file.

According to the present invention there is provided A method of storing a plurality of files in a memory, including the steps of: (a) establishing a default procedure for storing files in the memory; (b) establishing a second procedure, different from the default procedure, for storing files in the memory in accordance with respective desired performance characteristics; (c) for each file of the plurality, issuing an explicit command to a file system to store the each file in the memory in accordance with the respective desired performance characteristic thereof; and (d) storing the files of the plurality in the memory in accordance with the respective desired performance characteristics thereof, substantially concurrently, by the file system.

The basic method of the present invention stores a file in a memory by issuing a command to a file system to store the file in the memory in a way that enhances a desired performance characteristic of the file. The file system then stores the file in the memory in accordance with the command that the file system received. More precisely, a processor that executes the code of the file system and the code of a device driver of the memory stores the file in the memory in accordance with the command received by the file system.

Preferably, two procedures are established for storing files in the memory: a default procedure (typically a prior art procedure) that is used if the explicit command is not issued for a given file, and a second, different procedure that is used if the explicit command is issued for a given file.

More preferably, the second procedure includes storing at least a portion of the file in a physically contiguous portion of the memory or in a logically contiguous portion of the memory. Note that the terms "physically contiguous" and "physically continuous" are used interchangeably herein.

Most preferably, the physically contiguous portion of the memory is larger than the smallest physically contiguous portion of the memory that is used by the default procedure.

Also most preferably, in the case of a memory such as a flash memory in which the smallest chunk of memory space that is erased in a single erase operation is larger than the chunk of memory that is read or written in a single read or write operation, the physically contiguous portion of the memory is at least such a smallest chunk of memory that is erased in a single erase operation. This smallest chunk of memory that is erased in a single erase operation is called an "erase unit" herein.

Also most preferably, the entire file is stored in the physically contiguous portion of the memory.

Most preferably, in order to store the file, the file system seeks a physically contiguous and empty portion of the memory that is sufficiently large to accommodate the at least portion of the file that is to be stored in a physically contiguous portion of the memory. If the file system fails to find such a sufficiently large, physically contiguous and empty portion of the memory, the file system creates the needed physically continuous and empty portion. For example, the file system instructs the flash memory, via the flash memory's device driver, to re-arrange storage of files currently stored in the memory to free up the required physically contiguous portion. Also most preferably, the physically contiguous portion of the memory is a plurality of physically contiguous sectors of the memory. Also most preferably, after the file has been stored in the memory, the unused remainder of the physically contiguous portion of the memory is released for storing other files.

More preferably, the second procedure includes allocating space in the memory for at least a portion of the file before the file system actually receives any of the file's data to store. Either a default amount of space is allocated or an amount of space determined according to a parameter of the explicit command is allocated. Most preferably, the allocated space is physically contiguous, for example a plurality of physically contiguous sectors of the memory. Also most preferably, after the file has been stored in the memory, the unused remainder of the physically contiguous allocated space is released for storing other files.

Preferably, the desired performance characteristic is enhanced write performance, enhanced read performance, or enhanced latency performance, relative to a file of similar size stored in the medium by the file system's default method.

Preferably, the command is issued before the file is created. Alternatively, the command is issued after the file is created but before data to store in the file are provided, after data to store in the file are provided but before the file is closed, or after the file is closed. If the command is issued after data to store in the file are provided, before or after the file is closed, then most preferably storing the file includes defragmenting at least a portion of the memory where the file is located.

A data processing device of the present invention includes a memory and a file system of the present invention for storing files in the memory. The file system supports an explicit command for storing files in the memory in accordance with the desired performance characteristics of the files.

A computer readable storage medium of the present invention has embodied thereon computer readable code of a file system of the present invention.

Also according to the present invention, after the explicit command has been issued for each of a plurality of files, the files are stored substantially concurrently. The file system of the present invention supports this concurrent storage. This concurrent storage is one of the features of the present invention that distinguishes the present invention from the prior art FDI, which handles only one packet stream at a time. Another feature of the present invention that distinguishes the present invention from FDI is that the explicit command of the present invention defines a desired performance characteristic without defining explicitly how that desired performance characteristic is to be obtained. In FDI, a user defines in advance of writing that X chunks of Y bytes each are to be written. The user then can write up to X times, with no more than Y bytes being written each time. In addition, the data written under FDI are not associated, in the FDI write commands, with a named file.

It should be emphasized that there is a difference between the present invention and the teachings of US 2005/0193025 mentioned above. While both inventions deal with optimizing file handling in a file system by using different policies for different files, the methods by which the file system learns about the desired characteristics of the files are not the same. In US 2005/0193025 the file system must gain knowledge of a file's instance of some property of the file, for example the type of the file, in order to select the proper policy for handling the file (for example by watching out for certain file extensions or certain directory names). The file system then consults a management protocol that corresponds to the property to determine the policy. The calling application's instruction on what policy to apply to the file thus is implicit, via the file property that indicates to the file system which management protocol to consult. By contrast, in the present invention it is not necessary for the file system to know any properties of the file in order to apply to the file a specific handling policy, as the calling application dictates the desired performance characteristics for any file desired by issuing explicit calls to the file system. Therefore, while there may be implementations where the methods of both inventions are both used, there may also be implementations where the methods of either one invention but not the other are used.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a file system that supports ad hoc optimization of the performance characteristics of files. Specifically, the present invention can be used to optimize the read, write or latency characteristic of a selected file.

The principles and operation of a file system according to the present invention may be better understood with reference to the drawings and the accompanying description.

First Example

High Write Performance

A video streaming application 16 in a cellular phone initiates a session in which application 16 downloads a video file over the air and stores the video file in the phone's local storage 10 for later replay. The download protocol requires application 16 to accept any packet of data when sent by the source, with no mechanism for asking the source to pause or re-transmit. The phone's RAM memory is limited in capacity, and cannot be used for buffering incoming data until it can be permanently stored in medium 10. Therefore high write performance (and also low latency time) is vital for successful operation under these conditions.

The phone employs a storage system implemented according to the methods of the present invention. Immediately after establishing the connection with the source (and before starting the data download) application 16 creates a new file for storing the incoming data. This is done by issuing to a file system 14 of the present invention the following file system call:

fileHandle=CreateFile("NewsVideo")

or a similar file system call, where "NewsVideo" is the name of the new file and "fileHandle" is a handle used by application 16 for referring to the file in later calls.

Then application 16 informs file system 14 of the present invention about the desired characteristics of the new file, using the file system call:

SetFileForFastWrite(fileHandle, EstimatedSize)

or a similar file system call, where "fileHandle" is the handle previously returned by the CreateFile call, and "EstimatedSize" is (an optional) input telling file system 14 of the present invention what application 16 expects the file size to be.

Now file system 14 of the present invention knows what is required of it when writing the NewsVideo file. In one exemplary embodiment of the present invention, file system 14 immediately allocates the file an amount of space equal in size to EstimatedSize (or a default size if no estimated size was provided). The file gets this allocation immediately, even though data have yet to be provided for the file.

Now when application 16 issues the file system call:

WriteFile(fileHandle, pBuffer, iLength)

or a similar file system call, file system 14 of the present invention writes buffer contents of size iLength and pointed to by pBuffer into the already allocated space. It is guaranteed that (as long as the expected size is not exceeded) the required space is available without having to do any time-consuming and slow storage recycling.

After many such WriteFile calls the session ends and application 16 issues the file system call:

CloseFile(fileHandle)

or a similar file system call. File system 14 of the present invention now "cleans up": any extra space allocated and not used is released, any mismatch between actual file size and directory entry length field is corrected, etc.

In summary, application 16 obtains optimal write performance for the incoming video file using the sequence of file system calls:

```
fileHandle = CreateFile("NewsVideo")
SetFileForFastWrite(fileHandle, EstimatedSize)
WriteFile(fileHandle, pBuffer, iLength)
    .
    .
    .
WriteFile(fileHandle, pBuffer, iLength)
CloseFile(fileHandle)
```

This is in contrast to the default sequence of file system calls, which is identical to the sequence of file system calls for a corresponding prior art file system 14:

```
fileHandle = CreateFile("NewsVideo")
WriteFile(fileHandle, pBuffer, iLength)
    .
    .
    .
WriteFile(fileHandle, pBuffer, iLength)
CloseFile(fileHandle)
```

The only new file system call provided by the present invention in this example is the SetFileForFastWrite call. Note that the SetFileForFastWrite call provides both optimized write performance and optimized latency performance during the writing of the new file.

Second Example

High Read Performance

A game console includes a storage system for storing game applications that are loaded into RAM and executed at the user's will. While write performance is unimportant (the game applications are stored just once), read performance is extremely important as it affects the time from when the user selects a game to run until the game actually runs. There is no memory paging support in the device's operating system, so the full application must be loaded before it can start execution.

The console employs a storage system implemented according to the methods of the present invention. When storing the game application into the device (e.g. at the manufacturing site or upon downloading a new game application from the Internet), a storing application 16 creates a new file for storing the game code. This is done by issuing the file system call:

filehandle=CreateFile("PacMan")

or a similar file system call, where "PacMan" is the name of the new file and "fileHandle" is a handle used by application 16 for referring to the file in later calls.

Then application 16 informs file system 14 of the present invention about the desired characteristics of the new file, using the file system call:

SetFileForFastRead(fileHandle, EstimatedSize)

or a similar file system call, where "fileHandle" is the handle previously returned by the CreateFile call, and "EstimatedSize" is (an optional) input telling file system 14 of the present invention what application 16 expects the file size to be.

Now file system 14 of the present invention knows what is required of it when writing the PacMan file. In one exemplary embodiment of file system 14 of the present invention, nothing is done at this stage, except for "remembering" the request.

Now when application 16 issues the file system call:

WriteFile(fileHandle, pBuffer, iLength)

or a similar file system call, file system 14 of the present invention allocates space (if needed) and writes buffer contents of size iLength and pointed to by pBuffer into the newly allocated space. Noting that this file is marked for fast reading, the allocation does not just grab any available free cluster from the File Allocation Table, but looks for a contiguous group of free clusters, preferably covering a complete erasable unit of flash medium 10. Once found, the complete group is allocated, even though it might be much larger than is needed for the current write request.

In subsequent WriteFile calls, more space may or may not be allocated, depending on whether the contiguous group of free clusters presently being written to has enough room for the new data.

After many such WriteFile calls the session ends and application 16 issues the file system call:

CloseFile(fileHandle)

or a similar file system call. File system 14 of the present invention now "cleans up": any extra space allocated and not used is released, any mismatch between actual file size and directory entry length field is corrected, etc. The end result is a file allocated in large contiguous chunks, which when read continuously from beginning to end, achieves a much faster than average read performance, as the storage system low-level read functions are set to automatically exploit any sequentiality detected in the read requests.

In summary, application 16 obtains optimal read performance for the incoming game application using the sequence of file system calls:

```
fileHandle = CreateFile("PacMan")
SetFileForFastRead(fileHandle, EstimatedSize)
WriteFile(fileHandle, pBuffer, iLength)
    .
    .
    .
WriteFile(fileHandle, pBuffer, iLength)
CloseFile(fileHandle)
```

This is in contrast to the default sequence of file system calls, which is identical to the sequence of file system calls for a corresponding prior art file system 14:

```
fileHandle = CreateFile("PacMan")
WriteFile(fileHandle, pBuffer, iLength)
    .
    .
    .
WriteFile(fileHandle, pBuffer, iLength)
CloseFile(fileHandle)
```

The only new file system call provided by the present invention in this example is the SetFileForFastRead call.

Note that several SetFileForFastWrite or SetFileForFastRead commands may be issued with different values of fileHandle (i.e., for different files), and then the WriteFile commands for the various files may be interleaved. In other words, several files may be written concurrently.

These two examples illustrate embodiments of the present invention in which calling application 16 requests the desired performance characteristics after creating the file and before starting writing data into the file. The present invention is not limited to such embodiments. Each one of the following approaches are within the scope of the present invention:
   a. Application 16 provides guidance before creating the file, for example by issuing a file system call that means "the next file to be created must have a specified characteristic".
   b. Application 16 provides guidance after creating the file but before providing the file's data to the storage system (as in the two examples above).
   c. Application 16 provides guidance after providing the data of the file to the storage system, but before closing the file. This is of course useful only for optimizing read performance, and usually requires the storage system to do re-arrangement of the file after the file was already written in a non-optimal manner.
   d. Application 16 provides guidance after closing the file. This, too, is only for optimizing read performance and usually requires re-arrangement of the file in storage.

One way to implement approaches c and d is to defragment the file (as opposed to the prior art method of defragmenting the entire medium 10, which process, as noted above, typically is very slow.)

The above two examples assume that physically contiguous storage is available in medium 10 when requested, either by the SetFileForFastWrite call of the first example or by the WriteFile calls of the second example. Those skilled in the art will readily imagine measures that can be taken, either by application 16 or by file system 14 of the present invention or by both software components, in case such physically contiguous storage is not available in medium 10. For example, a modified SetFileForFastWrite call of the form
   iError=SetFileForFastWrite(fileHandle, EstimatedSize)
returns an error code ("iError") to application 16 indicating whether the requested physically contiguous storage is available and allocated (iError=0) or not available (iError=1). In the latter case, application 16 has the option of reverting to the default file writing call sequence, with no write performance optimization, or of closing the new file, deleting old files (e.g. in first-in-first-out order) with appropriate calls to file system 14 of the present invention, and re-opening the new file (e.g. with calls including a call of the type "OpenFile(fileHandle")) for optimized writing. File system 14 of the present invention translates the calls received from application 16 into appropriate calls to device driver 12 to clear sufficient contiguous physical space in medium 10 to accommodate the new file. A modified SetFileForFastRead call of the form
   iError=SetFileForFastRead(fileHandle, EstimatedSize)
behaves analogously.

Alternatively, the SetFileForFastWrite command and the SetFileForFastRead command act as "best effort" commands without returning error codes. If file system 14 determines that the desired performance characteristics cannot be obtained, for example because not enough contiguous space can be allocated, file system 14 reverts to one of the prior art methods of storing data in storage device 10.

Figure 3:
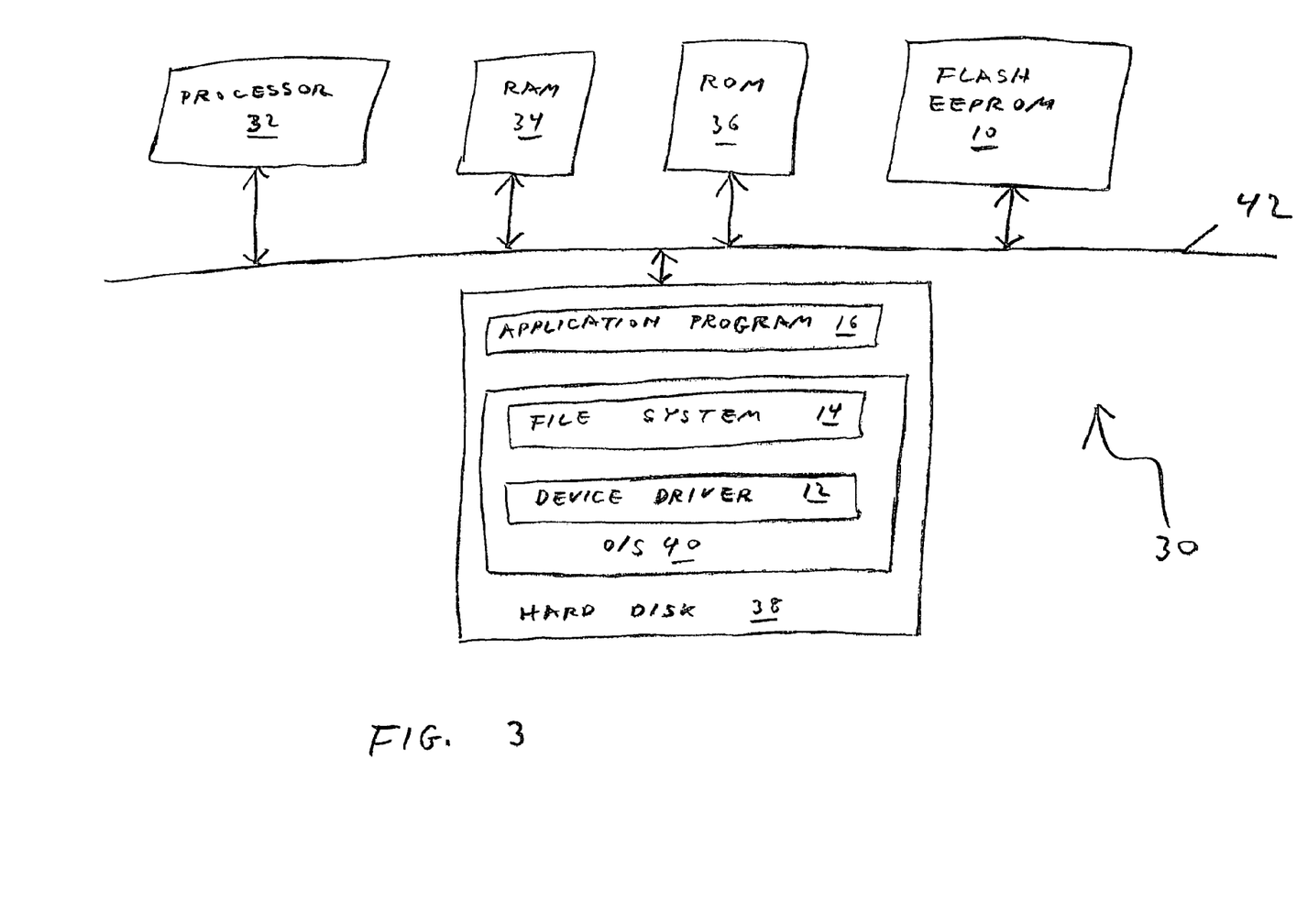
FIG. 3 is a partial high-level block diagram of a data processing device of the present invention.

FIG. 3 is a partial high-level block diagram of a data processing device 30 of the present invention. Device 30 includes a processor 32, a volatile memory (specifically, a RAM) 34 and three non-volatile memories: a ROM 36, a hard disk 38, and, serving as physical storage medium 10, a flash EEPROM. Hard disk 38 has stored thereon application programs 16 and, as part of an operating system 40, a device driver 12 for flash EEPROM 10 and a file system 14 of the present invention. Processor 32, volatile memory 34 and non-volatile memories 36, 38 and 10 communicate with each other via a bus 42. When device 30 is powered up, processor 32 runs boot code from ROM 36. One of the functions of the boot code is to load operating system 40 from hard disk 38 into RAM 34. Once operating system 40 is loaded into RAM 34, processor 32 proceeds to load one of application programs 16 into RAM 34 and to execute that application program 16. The executed application program 16 downloads files from outside device 30, e.g. via a network (not shown) to which device 30 is connected by conventional means (also not shown) and stores these files in flash EEPROM 10, optimizing the read, write and/or latency performance of the files as needed using appropriate calls to file system 14 of the present invention. As described above, the files may be stored in flash EEPROM 10 concurrently.

Hard disk 38 also represents a computer readable storage medium having embodied thereon a file system 14 of the present invention.

While the invention has been described with respect to a limited number of embodiments, it will be appreciated that many variations, modifications and other applications of the invention may be made.

What is claimed is:

1. A method of storing a file in a flash memory, the method comprising:
   receiving, by a file system, an explicit file system command, wherein the explicit file system command is configured to store the file in the flash memory in accordance with a desired performance characteristic, the desired performance characteristic indicated by the explicit file system command, wherein the explicit file system command includes a parameter value that is associated with the file; and
   storing the file in a contiguous portion of the flash memory in accordance with the desired performance characteristic and according to the parameter value included in the explicit file system command, wherein the storing of the file is conditioned on the contiguous portion of the flash memory being large enough to accommodate storage of the file.

2. The method of claim 1, wherein the parameter value indicates a file size associated with the file, and wherein the method includes, prior to storing the file in the memory, allocating the contiguous portion of the flash memory to receive the file, wherein a size of the contiguous portion of the flash memory is determined based on the parameter value.

3. The method of claim 2, wherein the contiguous portion of the flash memory has a default size.

4. The method of claim 2, further comprising receiving a close file command, and in response, releasing an unused part of the allocated contiguous portion of the flash memory.

5. The method of claim 2, wherein the allocated contiguous portion of the flash memory has a size of at least one erase unit of the flash memory.

6. The method of claim 2, wherein the allocated contiguous portion of the flash memory includes a plurality of physically contiguous pages of the flash memory.

7. The method of claim 1, wherein storing includes seeking an empty contiguous portion of the memory, wherein the empty contiguous portion is sufficiently large to accommodate the file.

8. The method of claim 7, further comprising conditioned on failing to find the empty contiguous portion of the memory, creating the empty contiguous portion of the memory by at least one of relocating existing data at a first location of the flash memory and erasing the existing data at the first location of the flash memory.

9. The method of claim 1, wherein the explicit file system command is received before the file is created.

10. The method of claim 1, wherein the explicit file system command is received after the file is created and before data to be stored in the file is received.

11. The method of claim 1, wherein the explicit file system command is received after data to be stored in the file is received and before the file is closed.

12. The method of claim 1, wherein the storing is effected by defragmenting at least the contiguous portion of the flash memory.

13. The method of claim 1, wherein the explicit file system command is received after the file is closed.

14. A data storage device comprising:
a flash memory; and
a file system module that supports:
storing a file in the flash memory in accordance with a default procedure; and
storing the file in a contiguous portion of the flash memory in accordance with a desired performance characteristic and according to a parameter value associated with the file by executing a second procedure that is different from the default procedure, wherein the second procedure allocates the contiguous portion of the flash memory in response to receiving an explicit file command that indicates the desired performance characteristic and that indicates the parameter value associated with the file, wherein the storing of the file in the contiguous portion of the flash memory is conditioned on the contiguous portion of the flash memory being large enough to accommodate storage of the file.

15. The data storage device of claim 14, wherein the parameter value associated with the file indicates a file size of the file.

16. A computer readable non-transitory storage medium having embodied thereon computer readable code for a file system, the computer readable code comprising program code that supports:
a default procedure, wherein the default procedure is configured to store a file in a flash memory; and
a second procedure, wherein the second procedure is configured to store the file in the flash memory in accordance with a desired performance characteristic and according to a parameter value associated with the file, wherein the second procedure differs from the default procedure, and wherein the second procedure allocates a contiguous portion of the flash memory in response to receiving an explicit file command that indicates the desired performance characteristic and that indicates the parameter value associated with the file, wherein the file is stored in the contiguous portion of the flash memory conditioned on the contiguous portion of the flash memory being large enough to accommodate storage of the file.

17. A method of storing a plurality of files in a flash memory, the method comprising:
for each file of the plurality of files, receiving by a file system a corresponding explicit file system command that indicates a respective desired performance characteristic and a respective parameter value associated with the file; and
storing the plurality of files substantially concurrently, wherein each file is stored in a corresponding contiguous portion of the flash memory in accordance with the respective desired performance characteristic and according to the respective parameter value by executing the corresponding explicit file system command, wherein the storing of each file of the plurality of files is conditioned on the corresponding contiguous portion of the flash memory being large enough to accommodate storage of the file.

18. The method of claim 17, further comprising prior to storing, allocating the corresponding portion of the flash memory to receive the file, wherein a size of the corresponding portion is determined based upon the parameter value indicated by the corresponding explicit file system command.

19. A method of storing a plurality of files, the method comprising:
at a data storage device with a file system and a flash memory,
for each of at least two files of the plurality of files, receiving, by the file system, a corresponding explicit file system command that instructs the file system to store the file in the flash memory, wherein each explicit file system command indicates a desired performance characteristic and each explicit file system command indicates a parameter value associated with the corresponding file; and
storing the at least two files in the memory substantially concurrently, wherein each file is stored in a corresponding contiguous portion of the flash memory that is large enough to accommodate storage of the file, and wherein each file is stored in accordance with the respective desired performance characteristic indicated by the corresponding explicit file system command and in accordance with the corresponding parameter value indicated by the corresponding explicit file system command.

20. The method of claim 19, wherein each parameter value indicates a file size associated with the corresponding file.

21. The method of claim 20, further including, prior to storing the file in the memory, allocating a corresponding portion of the memory to receive each file, wherein the allocated portion is at least as large as a file size indicated by the parameter value.

22. A data storage device comprising:
a flash memory; and
a file system module configured to cause each file of a plurality of files to be stored in the memory in response to a command, wherein the file system module is configured to support:
a default procedure that stores a first file of the plurality of files in the memory; and
one or more second procedures that differ from the default procedure, each second procedure storing a corresponding file of the plurality of files in the memory, each second procedure allocating a corresponding contiguous portion of the flash memory that is large enough to accommodate storage of the corresponding file in response to receiving an explicit file command that indicates a corresponding desired performance characteristic and that indicates a parameter value associated with the corresponding file.

23. The data storage device of claim 22, wherein each parameter value indicates a file size associated with the corresponding file.

24. The data storage device of claim 23, wherein the allocated portion is at least as large as the file size indicated by the parameter value.

25. The data storage device of claim 22, wherein the file system module is configured to support concurrent storage of the plurality of files, each file stored according to the corresponding second procedure.

* * * * *